United States Patent [19]

Covert et al.

[11] Patent Number: 5,462,100
[45] Date of Patent: Oct. 31, 1995

[54] FUEL FILL VAPOR RECOVERY SYSTEM WITH DIFFERENTIAL PRESSURE CONTROL VALVE

[75] Inventors: Charles H. Covert, Manchester; Richard W. Wagner, Albion; Kenneth W. Turner, Webster; Karen M. Meyer, Avon, all of N.Y.

[73] Assignee: General Motors Corporation, Detroit, Mich.

[21] Appl. No.: 299,282

[22] Filed: Aug. 31, 1994

Related U.S. Application Data

[63] Continuation-in-part of Ser. No. 121,932, Sep. 15, 1993, abandoned.

[51] Int. Cl.[6] .................................................... F16K 17/04
[52] U.S. Cl. ...................... 141/59; 141/44; 141/46; 141/302; 220/86.2; 137/43; 137/589
[58] Field of Search ................... 141/44–46, 59, 141/302; 220/86.2, 89.1; 137/43, 587–589

[56] References Cited

U.S. PATENT DOCUMENTS

| | | | |
|---|---|---|---|
| 4,699,638 | 10/1987 | Harris | 55/168 |
| 4,714,172 | 12/1987 | Morris | 220/86.2 |
| 4,762,156 | 8/1988 | Rich | 141/46 |
| 4,790,349 | 12/1988 | Harris | 137/587 |
| 4,846,208 | 7/1989 | Hempel et al. | 137/43 |
| 4,869,283 | 9/1989 | Oeffling et al. | 137/43 |
| 4,874,020 | 10/1989 | Bucci | 141/59 |
| 4,887,578 | 12/1989 | Woodcock et al. | 123/519 |
| 4,953,583 | 9/1990 | Szlaga | 137/118 |
| 5,054,508 | 10/1991 | Benjey | 137/43 |
| 5,054,520 | 10/1991 | Sherwood et al. | 137/587 |
| 5,099,880 | 3/1992 | Szlaga et al. | 137/587 |
| 5,156,178 | 10/1992 | Harris | 137/43 |
| 5,205,330 | 4/1993 | Sekine | 141/59 |
| 5,215,132 | 6/1993 | Kobayashi | 141/302 |
| 5,234,022 | 8/1993 | Harris | 137/498 |
| 5,244,022 | 9/1993 | Gimby | 141/301 |
| 5,327,934 | 7/1994 | Thompson | 137/588 |

FOREIGN PATENT DOCUMENTS

WO93/14366  7/1993  WIPO.

*Primary Examiner*—J. Casimer Jacyna
*Attorney, Agent, or Firm*—Robert M. Sigler

[57] ABSTRACT

A refueling vapor recovery system for a vehicle utilizes recirculation of a portion of the displaced vapor and combines a vapor vent valve and a recirculation control into a single differential pressure valve assembly. A vapor vent conduit provides fuel tank vapor pressure to one side of a diaphragm and, through a restricted orifice, to the other side of the diaphragm, the other side being further connected by a recirculation conduit to the tank filler neck. When a gas cap closes the filler neck from the atmosphere, the orifice allows pressure to equalize across the diaphragm; and a spring biases the diaphragm to close a vapor vent valve. When the gas cap is removed, atmospheric pressure is provided through the recirculation conduit to the other side of the diaphragm, which can then be activated by a relatively small differential pressure to open the vent for relatively unrestricted vapor flow from the tank to a canister during refueling, with a small portion of the vapor recirculated in a controlled flow through the orifice and recirculation conduit to the filler neck for entrainment in incoming liquid fuel.

6 Claims, 4 Drawing Sheets

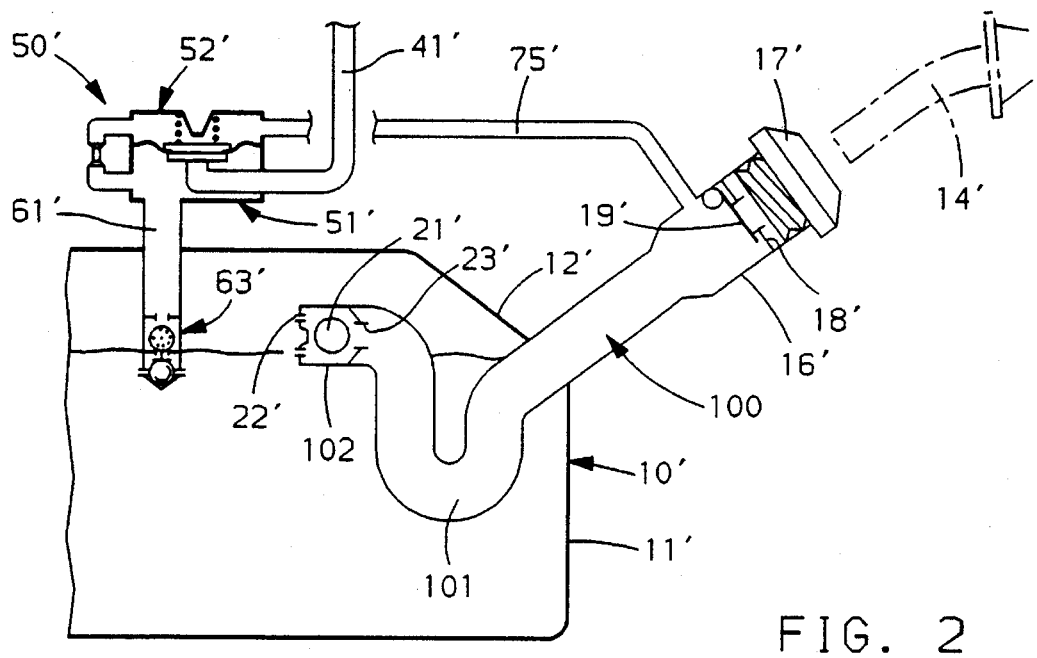
FIG. 2
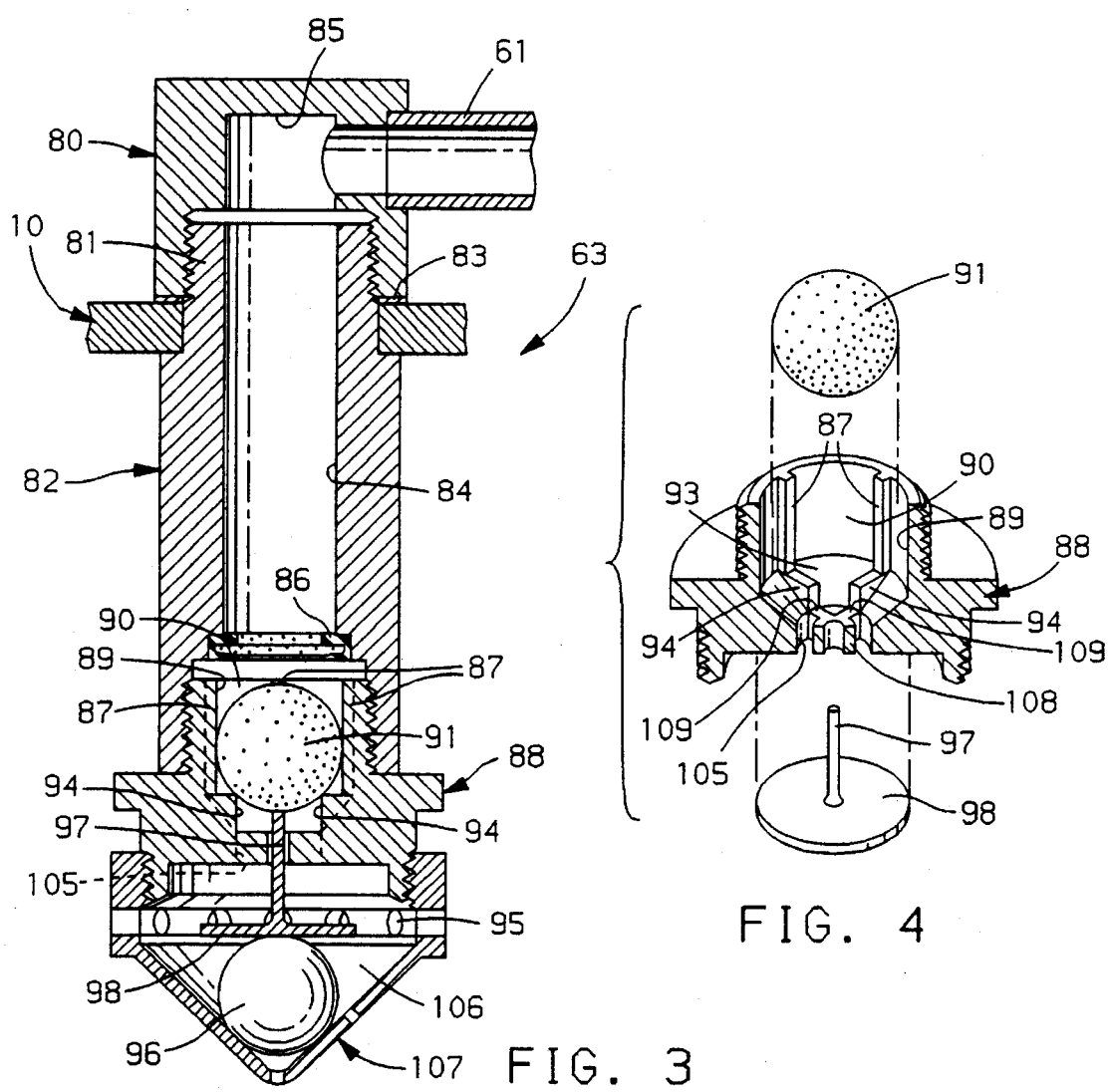
FIG. 3
FIG. 4

5,462,100

FUEL FILL VAPOR RECOVERY SYSTEM WITH DIFFERENTIAL PRESSURE CONTROL VALVE

This is a continuation-in-part of U.S. Ser. No. 08/121,932, filed 15 Sep. 1993 now abandoned and assigned to the assignee of this application.

BACKGROUND OF THE INVENTION

This invention relates to a system for recovering the vapor displaced from a fuel tank during fuel fill using valve apparatus for control of vapor flow to a storage canister and recirculation of a portion of the vapor via the fill pipe.

Emission control standards for vehicle fuel systems are now beginning to require recovery of fuel vapors displaced from a vehicle fuel tank during refueling. U.S. Pat. No. 4,762,156 to Rich discusses the use of a liquid seal in a fuel fill pipe with a vapor recirculation system to replace air which would otherwise be drawn into the fill pipe and entrained by the inrushing fuel. Such entrained air has been shown to increase the generation of vapor within the tank during refueling through liquid seals; and the additional vapor would necessitate a larger storage canister. The Rich apparatus uses a vapor vent valve actuated during refueling to allow a flow of displaced vapor to a storage canister and a separate recirculation valve apparatus effective to recirculate a portion of the displaced vapor to the fuel fill pipe at the filler neck for entrainment in the inrushing fuel at a rate depending on the rate of fuel flow. The vapor so entrained reduces the air drawn into the fill pipe by the inrushing fuel; and this reduces the tendency for additional vapor to form in the process.

SUMMARY OF THE INVENTION

This invention is a refueling vapor recovery system for a vehicle which utilizes recirculation of a portion of the displaced vapor and combines a vapor vent valve and a recirculation control into a single differential pressure valve assembly. The differential pressure valve assembly comprises a housing defining first and second chambers separated by a diaphragm carrying a valve member. An internal conduit has an end defining a valve seat adjacent the valve member. A biasing spring biases the valve member toward engagement with the valve seat; and the diaphragm is responsive to a varying differential pressure to move the valve member into and out of engagement with the valve seat to close and open the internal conduit to the first chamber. A vapor vent conduit communicates a vapor collection region of the fuel tank with the first chamber; and a vapor recovery conduit communicates the internal conduit with the vapor storage canister.

The first and second chambers of the valve assembly are communicated through a restricted orifice; and a vapor recirculation conduit communicates the second chamber of the valve assembly with the filler neck. The orifice allows equalization of pressure across the diaphragm when the filler neck is closed from the atmosphere by the gas cap to allow the spring to maintain the valve member in engagement with the valve seat. However, when the gas cap is removed from the filler neck, the recirculation conduit provides communication of atmospheric pressure to the second chamber to allow the diaphragm to be activated by a differential pressure during refueling so as to move the valve member out of engagement with the valve seat and thus permit relatively unrestricted vapor flow from the fuel tank to the vapor storage canister, with a portion of the vapor flow from the tank flowing at a controlled rate through the orifice and the recirculation conduit to the filler neck for recirculation by entrainment in incoming liquid fuel.

Thus, the apparatus of this invention allows cost savings and reduced complexity by providing for valve control by a single differential valve assembly of vapor venting from the fuel tank to a canister during refueling only and for a portion of the vented vapor to be recirculated through the filler neck and entrainment in liquid fuel during refueling to reduce the amount of vapor to the canister. The restricted orifice in the vapor recirculation conduit allows pressure equalization across the diaphragm with the fill pipe closed from the atmosphere to prevent even a small differential pressure from forming; and this allows the valve spring to be calibrated for activation by a small differential pressure when the gas cap is removed to provide atmospheric pressure through the vapor recirculation conduit to the upper side of the diaphragm. Thus, vapor venting via the relatively unrestricted vapor vent conduit is reliably prevented except during refueling and is reliably provided during refueling. In addition, the same restricted orifice also meters vapor fed back through the differential pressure valve assembly to the filler neck for entrainment in the incoming fuel to reduce vapor formation. Further details and advantages of this invention will be apparent from the accompanying drawings and following description of a preferred embodiment.

SUMMARY OF THE DRAWINGS

FIG. 2 shows a variation of the system of FIG. 1 using a modified fuel fill tube.

FIG. 3 shows a side cutaway view of a float valve for use in the systems of FIGS. 1 and 2.

FIG. 4 is a partially cutaway perspective view of a portion of the float valve of FIG. 3.

DESCRIPTION OF A PREFERRED EMBODIMENT

Figure 1:
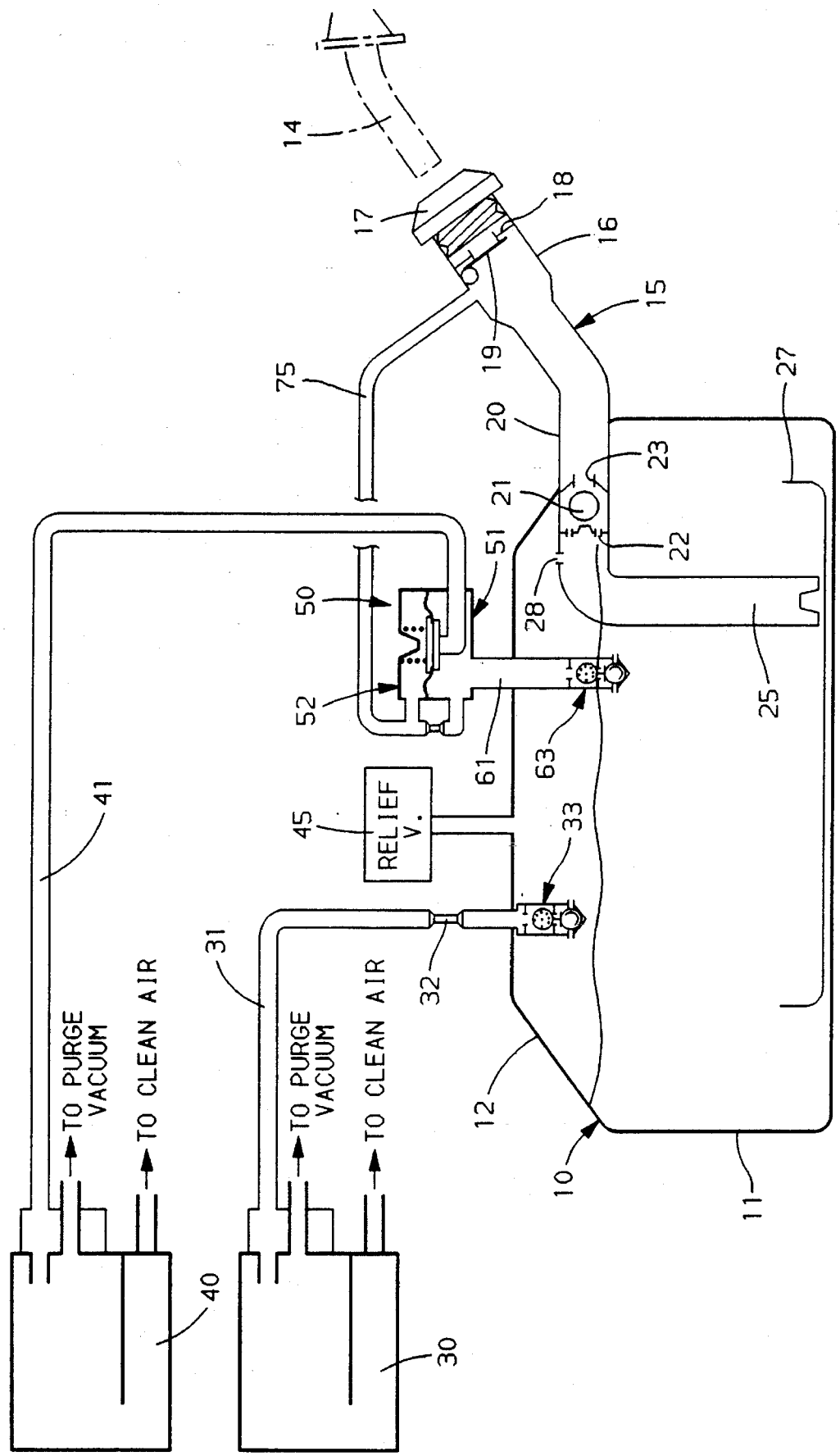
FIG. 1 shows, in schematic diagram, a vehicle fuel storage and refilling system using a vapor recovery system according to this invention.

Referring to FIG. 1, a motor vehicle fuel tank 10 comprises a lower liquid storage region 11 and an upper vapor dome 12. A fill pipe 15 with a filler neck 16 on the upper end thereof provides entry into tank 10 during refueling by fuel from a fuel nozzle 14 inserted into filler neck 16. A filler cap 17 is shown in a screwed in position in which it closes the open end of filler neck 16. When filler cap 17 is removed, filler neck 16 is partially closed in the normal manner by a splash shield 18 having a larger opening for the insertion of nozzle 14 and one or more smaller openings, not shown, for air or vapor flow therethrough. Behind splash shield 18, a spring loaded flap valve 19 of the normal type normally covers the large opening in the splash shield but is temporarily dislodged by the insertion of the properly sized nozzle 14 to allow refueling with unleaded fuel. The smaller openings and the clearance between splash shield 18 and an inserted nozzle 14 are sufficient to allow relatively easy gaseous communication between the interior of filler neck 16 and the atmosphere during refueling.

Fill pipe 15 further comprises a middle portion 20 including an anti-spitback ball 21 contained between a cage 22 on the tank side and a sealing valve seat 23 on the fill side thereof. Liquid flow into tank 10 is permitted as ball 21 is biased against cage 22; but liquid flow back out the filler neck is substantially prevented when ball 21 is biased by the fuel against sealing valve seat 23. The lower portion 25 of fill pipe 15 extends downward to a point near the bottom of tank 10 within a cup shaped reservoir 27 which always maintains a fluid level above the low end of fill pipe 15 for a liquid seal preventing the escape therethrough of vapor from an "empty" tank. An optional anti-siphon opening 28 may be provided on the upper side of middle portion 20 of fill pipe 15 below anti-spitback ball 21 to provide an additional relief passage of high vapor pressure within tank 10 around the liquid seal in lower portion 25 upon the removal of gas cap 17 if anti-spitback ball 21 does not operate correctly.

A standard vapor storage canister 30 is connected by a vapor recovery conduit 31 to vapor dome 12 of tank 10 through an orifice 32 and a float valve 33. Valve 33 serves to prevent entry of liquid fuel into canister 30 during vehicle maneuvers which create fuel slosh. Many designs for such valves are known, including a design shown in FIGS. 3 and 4 and described at a later point in this specification.

Orifice 32, which may be e.g. 0.055 inches in diameter, restricts vapor flow from tank 10 to canister 30 so as to reduce the creation of additional vapor within tank 10. The restriction of this orifice is such that it may be unable to conduct the much larger flow of vapor displaced from tank 10 during vehicle refueling. Therefore, an additional vapor storage canister 40, which is provided to store the vapor displaced during refueling, is connected to tank 10 through a vapor recovery conduit 41 which is sufficient in flow area to handle the larger vapor flow during refueling. However, conduit 41, with its free vapor flow, would defeat the purpose of orifice 32 in conduit 31 if kept open all the time.

Therefore, vapor flow through conduit 41 is controlled by a differential pressure valve assembly 50, which prevents vapor flow from tank 10 to canister 40 except during vehicle refueling. It should be mentioned that the number of canisters is unimportant to this invention: a single canister could be used in place of canisters 30 and 40, as long as it was of sufficient capacity to adsorb the vapor from both lines 31 and 41. Finally, a relief valve 45 may be provided for relief of unusually high internal tank pressures which would not be encountered during normal operation of the system.

Figure 5:
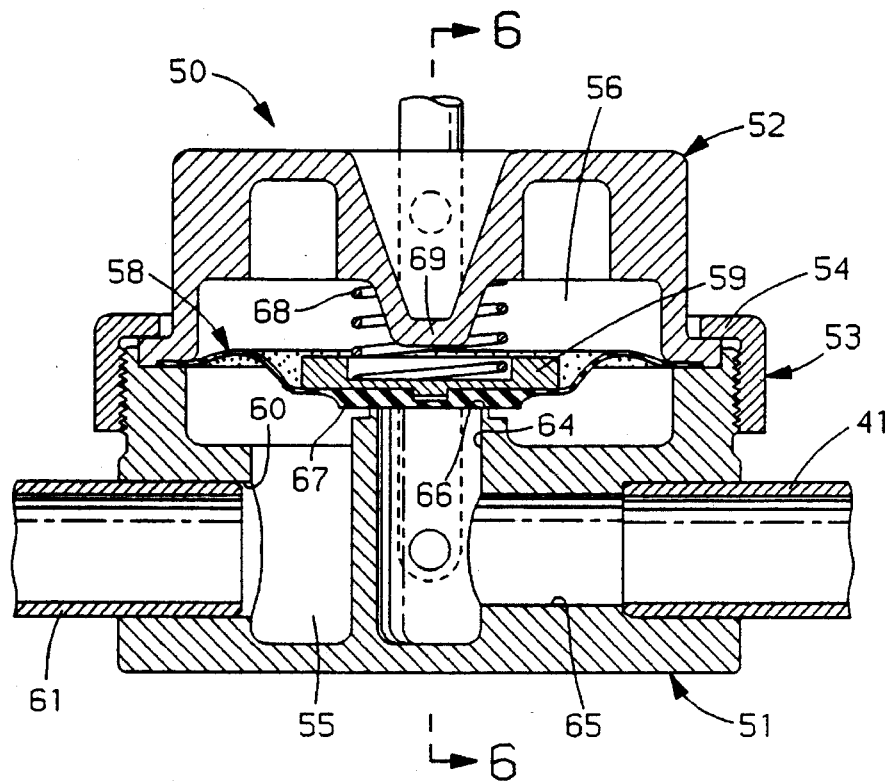
FIG. 5 shows a side cutaway view of a differential pressure valve assembly for use in the systems of FIGS. 1 and 2.
Figure 6:
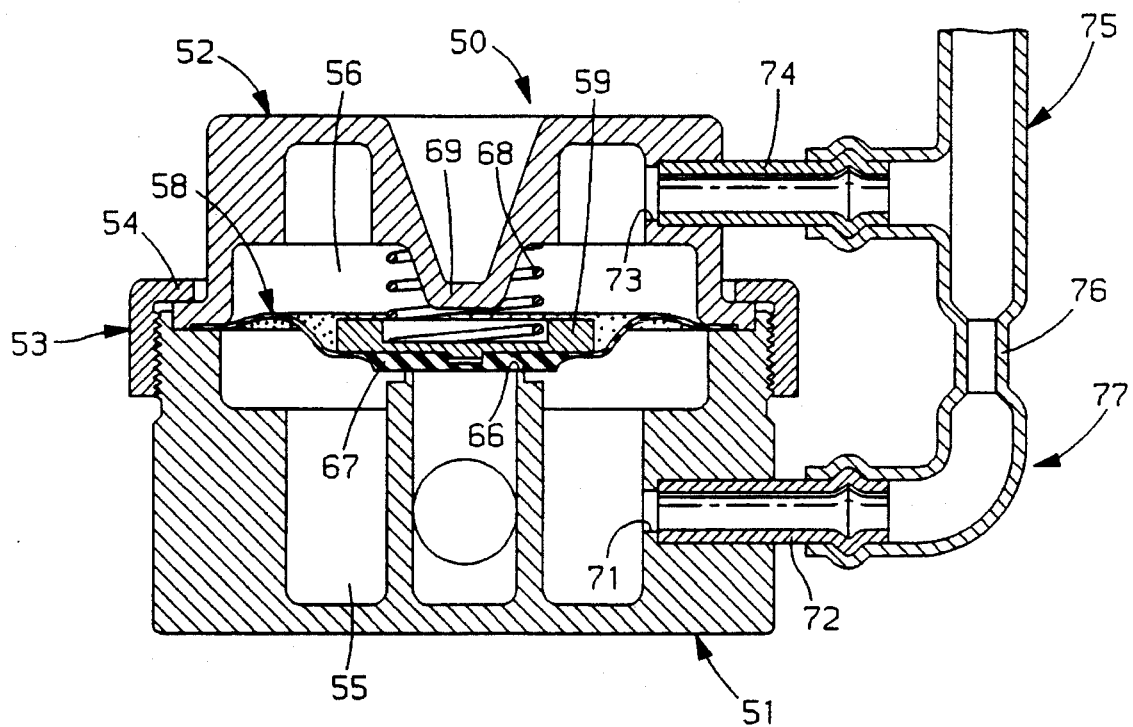
FIG. 6 shows a section view along lines 5—5 of FIG. 4.

One embodiment of differential pressure valve assembly 50 is shown in detail in FIGS. 5 and 6. Valve assembly 50 has a housing comprising lower housing member 51 and upper housing member 52, which are held together by a threaded nut 53 having a clamping flange 54. A generally circular, movable diaphragm 58 is clamped between housing members 51 and 52 so as to define a first or lower chamber 55 generally within housing member 51 and a second or upper chamber 56 generally within housing member 52. An internal conduit 60 is open from lower chamber 55 through the wall of lower housing member 51 to receive a vapor vent conduit 61 which communicates conduit 60 with vapor dome 12 of tank 10, as seen in FIG. 1. Vapor vent conduit 61 ends in a float valve 63 at its lower end, which allows vapor flow but prevents liquid flow from tank 10 to valve assembly 52.

As seen in FIG. 5, lower housing member 51 further defines an internal conduit 64 ending in a circular valve seat 66 open to lower chamber 55. A branch 65 of internal conduit 64 is open through the wall of lower housing member 51 to receive the end of vapor recovery conduit 41. A thickened portion 67 of diaphragm 58, stiffened by a metal spring receptor 59, comprises a valve member which, with the diaphragm in a first or lower position, engages valve seat 66 to close internal conduit 64 from lower chamber 55. A compression spring 68, anchored at one end on a spring platform 69 in upper housing member 52 and on the other end on spring receptor 59, biases diaphragm 58 and valve member 67 toward this position. However, diaphragm 58 is capable of being raised by a pressure differential sufficient to overcome spring 68 to a second or higher position in which valve member 67 disengages from valve seat 66 to allow communication between internal conduit 64 and first chamber 55, so that vapor dome 12 of tank 10 communicates with canister 40 through vapor vent conduit 61, differential pressure valve assembly 50 and vapor recovery conduit 41.

As seen in FIG. 6, a further conduit 71 through the wall of lower housing member 51 from chamber 55 receives a tube 72. In addition, a conduit 73 through the wall of upper housing member 52 from upper chamber 56 receives a tube 74. A vapor recirculation conduit 75 connects fuel filler neck 16 to tube 74 and thus communicates fuel filler neck 16 to second chamber 56. An extension 77 of conduit 75, which contains a restricted orifice 76, further connects to tube 72 and thus communicates chambers 55 and 56 through the restricted orifice 76.

Figure 7:
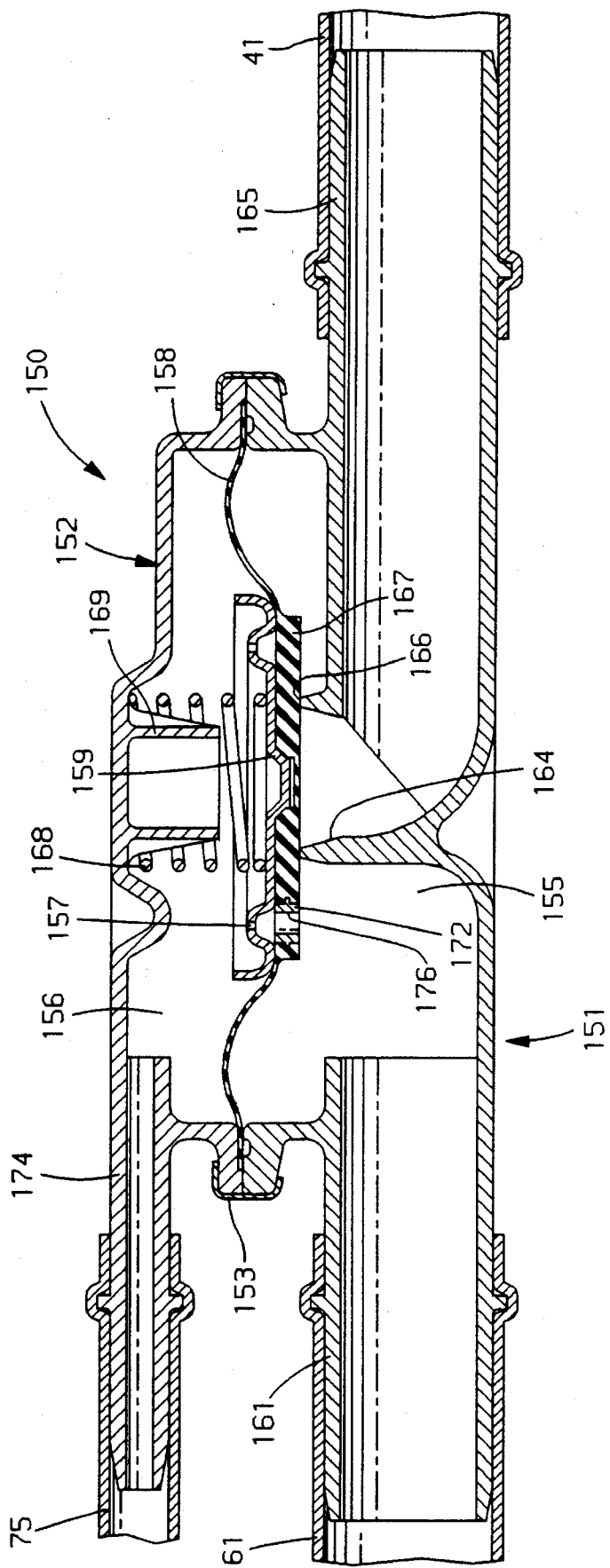
FIG. 7 shows a side cutaway view of an alternative embodiment of a differential pressure valve assembly for use in the systems of FIGS. 1 and 2.

An alternative differential pressure valve assembly 150 of FIG. 7, which would be preferred for mass production, is constructed with fewer parts than valve 50 and includes an internal orifice, but is otherwise similar in structure and operation. Differential pressure valve 150 comprises a lower housing 151 and upper housing 152 clamped together by clamp means 153. A flexible diaphragm 158 made of rubber or some other fuel resistant material, is clamped between housings 151 and 152 to define a lower chamber 155 below diaphragm 158 in housing 151 and an upper chamber 156 above diaphragm 158 in upper housing 152. Lower housing 151 also defines an internal conduit 164 below diaphragm 158 which is separate from lower chamber 155 but which communicates therewith through an opening defined by a circular horizontal valve seat 166 adjacent diaphragm 158. The other end of internal conduit 164 is defined by an outwardly projecting tube 165 formed in lower housing 151 and connected to vapor recovery conduit 41. Lower housing 151 further comprises an outwardly extending tube 161 which communicates with lower chamber 155 and to which is attached vapor vent conduit 61. Upper housing 152 comprises an outwardly extending tube 174 which communicates with upper chamber 156 and to which is attached vapor recirculation conduit 75.

Diaphragm 158 comprises a thickened central portion 167 which, further stiffened by a metal spring plate 159, forms a valve member adjacent valve seat 166. Cylindrical compression spring 168 within upper chamber 152 has an upper end supported and centered by a spring retainer 169 formed in upper housing 152 and a lower end engaging spring plate 159 to bias valve member 167 downward toward a position in which it sealingly engages and closes valve seat 166 to prevent communication between lower chamber 155 and internal conduit 164. An orifice insert 172 in thickened portion 167 of diaphragm 158 defines a restricted orifice 176 therethrough which, together with openings 157 through spring plate 159, allow a slow gaseous flow between chambers 155 and 156 to normally prevent any significant pressure differential across diaphragm 158. However, a flow of gas out of upper chamber 156 through vent conduit 75 which exceeds the flow capability of orifice 176, such as that which occurs during tank refilling, allows a pressure differential to form across diaphragm 158 so as to overcome the force of spring 168 and move valve member 167 upward from its valve seat engaging position to permit communication between lower chamber 155 and internal conduit 164.

In the following description of the operation of the system of FIG. 1, reference numerals are provided for the differential pressure valve assembly of FIGS. 5 and 6; but the description applies equally to the equivalent parts of the differential pressure valve assembly of FIG. 7. During vehicle operation other than refueling, restriction 76 between chambers 55 and 56 permits equalization of the pressure across diaphragm 58; and spring 68 biases valve member 67 against valve seat 66 to prevent vapor from escaping from tank 10 by way of conduit 41 to canister 40. Most vapor flow from tank 10 is at a slow rate through restricted conduit 31 to canister 30. Additionally, some small amount of vapor will flow from chamber 55 through restriction 76 and conduit 75 or through fill pipe 15 to filler neck 16; but it cannot escape the system due to the seal of gas cap 17. If optional anti-siphon opening 28 in used in the apparatus, it is made essentially the same size as that of restriction 76. In this case, the preceding description is modified by the fact that anti-siphon opening 28 serves as an additional restricted opening across diaphragm 58 in parallel with restriction 76, through a path including fill pipe 15 and conduit 75.

When gas cap 17 is removed for refueling, conduit 75 is exposed to atmospheric pressure through filler neck 16. If the pressure in tank 10 is a predetermined calibrated pressure, such as 4 inches of water, above atmosphere, spring 68 will be overcome and diaphragm 58 will move to its upper position. Lower chamber 55 will thus be open through internal conduit 61 to conduit 41. If the pressure in tank 10 is not sufficient as the gas cap is removed, it will soon become so as liquid fuel begins to flow from an inserted filler nozzle into tank 10 and displaces vapor within the tank. With the passage of liquid fuel down filler pipe 15, anit-siphon valve 28 can no longer pass fuel vapor from tank 10 to the upper side of diaphragm 58.

With conduit 61 open to conduit 41, most of the displaced vapor will then flow through valve assembly 50 and conduit 41 to canister 40. However, a small, calibrated amount of vapor will instead flow through orifice 76 and conduit 75 to filler neck 16, where it will become entrained in the liquid fuel entering fill pipe 15 through filler neck 16. This reduces the amount of air which would otherwise be entrained in the liquid fuel entering tank 10. Since the surface area between the liquid fuel and vapor bubbles already has fuel vapor on the vapor side, there is much less tendency for more vapor to form. In addition, if the liquid fuel entering tank 10 is at a lower temperature than the fuel, and thus the vapor, within tank 10, the vapor from tank 10 entrained in the liquid fuel entering the tank will be cooled thereby; and at least some of it will condense back into liquid fuel. This will further reduce the vapor that needs to be recovered.

Orifice 76 must be calibrated with care. If more vapor is allowed to flow to filler neck 16 than can be entrained in the liquid fuel, at least some of the excess might escape to the atmosphere. On the other hand, if less vapor is allowed to flow to filler neck 16 than can be entrained in the liquid fuel, the shortfall might be replaced by air from the atmosphere; and this will encourage the formation of more vapor in the tank. The amount of vapor or air that will be entrained in the liquid fuel in the filler neck will vary with the rate of liquid flow through the filler neck. Since the downstream side of orifice 76 is at atmospheric pressure, the rate of fuel flow therethrough to filler neck 16 will vary with excess tank pressure; and this will vary somewhat with the rate of liquid fuel flow into tank 10. Thus, the system appears to be somewhat self-compensating. However, the relationships are not linear; and the diameter of an unvarying orifice 76 must be chosen as a compromise between the limits of liquid fuel flow expected into tank 10. It appears, however, to be possible to find such a compromise value; and one such system has provided acceptable performance with an orifice 76 of 0.064 inches. Thus, with the apparatus of the system described herein, a flow control valve such as that shown in the previously mentioned patent to Rich is not necessarily required.

A variation of the system of FIG. 1 is shown in FIG. 2, wherein primed reference numerals indicate parts of similar structure and function. The only differences in the embodiment of FIG. 2 are concerned with the provision of a high feed rather than a low feed fuel fill pipe. Fill pipe 100 has a filler neck 16' similar to that of FIG. 1, a trap portion 101, and an inner end portion 102 containing an anti-spitback ball 21 with cage 22 and valve seat 23 similar to that of FIG. 1. Since the liquid seal is formed in trap portion 101, the lower cup shaped reservoir 27 of FIG. 1 is not necessary.

Float valve 63 is shown in detail in FIGS. 3 and 4. Vapor vent conduit 61 is received in an upper housing 80 threadedly engaged with an upper portion 81 of a middle housing 82 which projects out of vapor dome 12 of tank 10, with a gasket 83 providing sealing for tank 10. An internal conduit 84 of middle housing member 82 is open through an internal conduit 85 of upper housing member 80 to conduit 61 and, at its lower end, is fitted with a circular valve seat 86, made of a somewhat pliant material. A lower housing member 88, threaded to the lower end of middle housing member 82, defines, with middle housing member 82, an upper chamber 89 below valve seat 86 and open therethrough to internal conduit 84.

Upper chamber 89 comprises a cylindrical region 90 containing a float ball 91 made of a material having significantly less density than the liquid fuel within tank 10 but greater density than the fuel vapor therein and having a diameter sufficient to seal against valve seat 86 when floated upward by liquid fuel. Float ball 91 is guided in vertical movement by four straight guide ribs 87 projecting radially inward from the inner wall of region 90. Region 90 has a diameter greater than that of valve seat 86 or internal conduit 84. At the lower end of region 90, a region of decreasing diameter forms an inverted, truncated conical surface 93, seen most clearly in FIG. 4. From surface 93, four ball rest ribs 94 extend inwardly, aligned in this embodiment with guide ribs 87 but extending further radially inward, for support of float ball 91 in its rest position, as seen in FIG. 3.

Below upper chamber 89 in lower housing member 88 is a smaller diameter cylindrical conduit 105 which opens to a lower chamber 106 formed by lower housing member 88 and a lower retainer 107 threadedly attached thereto. Retainer 107 is provided with a plurality of openings 95 communicating lower chamber 106 with the interior of vapor dome 12 in tank 10. A ball 96, residing within lower chamber 106, is made of a material substantially denser than the liquid fuel within tank 10. A circular plate 98 rests horizontally on top of ball 96 and has formed therewith or attached thereto a vertical pin 97 projecting upwardly therefrom toward float ball 91. Pin 97 is maintained in a vertical orientation and guided in vertical movement by an annular cylindrical guide 108 vertically supported in the center of cylindrical conduit 105 by a plurality of supporting ribs 109 which may, as in this embodiment, be aligned with ribs 94 and 87.

When tank 10 is upright and not full, float ball 90 rests on ribs 94 and is not engaged with valve seat 86. Fuel vapor is thus able to flow out of tank 10, through float valve 63 and conduit 61, although it is essentially prevented from doing so by differential pressure valve assembly 50 except during vehicle refueling. When vehicle refueling occurs and the liquid level within tank 10 becomes sufficiently high to float ball 91 upward against valve seat 86, the exit of liquid fuel from tank 10 through float valve 63 is prevented while the exit of fuel vapor from tank 10 through float valve 63 is stopped. A rapid rise in vapor pressure within tank 10 closes the anti-spitback valve in fill pipe 15, whereupon fuel from nozzle 16 activates the automatic stop mechanism of nozzle 16 to end refueling.

During refueling, however, vapor flow upward through float valve 63 can be substantial and will generate a substantial upward force on float ball 91. Therefore, float valve 63 is designed so that the upward force of the fuel vapor on float ball 91 is counteracted by a downward Bernoulli force thereon created by the vapor as it flows past the lower surface of float ball 91. The flow area through cylindrical conduit 105 and the annular area between the lower surface of float ball 91 and inverted conical surface 93 is substantially smaller than that through the passages above float ball 91. Due to the Bernoulli effect, this creates a lowered pressure below float ball 91, especially between the lower surface of float ball 91 and the adjacent inverted conical surface 93, as compared with that above the ball. The downward force thus produced on the ball is, just like the upward force produced thereon by the vapor striking the lower surface, proportional to the pressure differential thereacross; and the former will thus effectively counteract the latter over the full range of pressure differentials (or vapor flow rates) encountered. The total force on float ball 91 is the sum of these forces plus the upward force of the buoyancy of the ball in the fluid (air, vapor or liquid) and the downward force of the weight of the ball. Since the weight of the ball is constant, the buoyancy force exerts the dominant variation in force on the ball over the full range of conditions encountered; and float ball 91 will stay below valve seat 86, even in substantial and rapid upward vapor flow, unless it is floated upward by liquid fuel. If the vehicle should happen to roll over, ball 96 will, by its high density compared with that of the liquid fuel and float ball 91, press float ball 91 downward against valve seat 86 to prevent the draining of liquid fuel from tank 10.

The apparatus described herein provides reliable activation of a valve to control venting of vapor from tank 10 through the relatively unrestricted vapor vent conduit 61 only during refueling. It is important to prevent such unrestricted venting and force venting from tank 10 through the restricted conduit 31 at all other times. Therefore, a fixed reference pressure, such as atmospheric pressure, is provided to upper chamber 56 only when gas cap 17 is removed to open upper chamber 56 to the atmosphere through recirculation conduit 75. At all other times, gas cap 17 closes upper chamber 56 from the atmosphere and restricted orifice 76 allows an equalization of pressure across diaphragm 58 to prevent unintended activation of diaphragm 58 upward against a comparatively small force of spring 68. The comparatively small force of spring 68 provides reliable activation of diaphragm 58 and operation of the fuel fill mechanism during refueling. At the same time, restricted orifice 76 provides a calibrated flow of vapor to filler neck 16 during refueling for recirculation. Economy is achieved in the variety of functions provided by a single valve assembly.

The embodiments of the invention in which an exclusive property or privilege is claimed are defined as follows:

1. In a vehicle having a fuel tank that is filled through a fill pipe having a filler neck that is open to atmosphere when a gas cap is removed therefrom for refueling, a vapor recovery system for storing vapor displaced from the fuel tank by liquid fuel from a refueling nozzle inserted in the filler neck comprising, in combination:

vapor storage canister means;

a valve assembly having a housing defining first and second chambers separated by a diaphragm carrying a valve member, the housing further defining an internal conduit separate from the first and second chambers and having an end defining a valve seat adjacent the valve member, the valve member being movable with the diaphragm in response to varying differential pressure into and out of engagement with the valve seat to close and open the internal conduit to the first chamber, and spring means biasing the valve member toward engagement with the valve seat;

a vapor vent conduit communicating a vapor collection region of the fuel tank with the first chamber of the valve assembly;

a vapor recovery conduit communicating the internal conduit with the vapor storage canister means;

a vapor recirculation conduit communicating the second chamber of the valve assembly with the filler neck; and means communicating the first and second chambers of the valve assembly through a restricted orifice to allow equalization of pressure across the diaphragm when the filler neck is closed from the atmosphere by the gas cap so as to allow the spring means to maintain the valve member in engagement with the valve seat to close the internal conduit from the first chamber, the vapor recirculation conduit providing communication of atmospheric pressure to the second chamber when the gas cap is removed from the filler neck with the restricted orifice in the means communicating the first and second chambers allowing the diaphragm to be activated by a differential pressure during refueling so as to move the valve member out of engagement with the valve seat and thus permit relatively unrestricted vapor flow from the fuel tank to the vapor storage canister means, with a portion of the vapor flow from the fuel tank flowing at a controlled rate through the restricted orifice and the recirculation conduit to the filler neck for recirculation by entrainment in incoming liquid fuel.

2. The vehicle of claim 1 in which the vapor collection region of the fuel tank is further communicated with the vapor storage canister means through an additional restricted orifice.

3. The vehicle of claim 1 in which the filler neck comprises a liquid fuel trap within the fuel tank to provide a liquid seal therein and the vapor recirculation conduit communicates with the filler neck on the gas cap side of the liquid fuel trap.

4. The vehicle of claim 1 in which the valve assembly comprises a first housing member and a second housing member clamped together with the diaphragm therebetween to define the first chamber in the first housing member and the second chamber in the second housing member, the first housing member comprises the valve seat adjacent and parallel to a valve member portion of the diaphragm, the second housing member comprises a spring seat opposite and parallel to the valve seat, the valve member comprises a spring plate adjacent and in contact with the valve member portion of the diaphragm and the spring means comprises a coil spring compressed between the spring seat and the spring plate.

5. The vehicle of claim 4 in which the restricted orifice is defined through the diaphragm.

6. The vehicle of claim 1 in which the vapor vent conduit comprises a float ball valve which allows vapor flow but prevents liquid flow from the fuel tank to the valve assembly.

* * * * *